UNITED STATES PATENT OFFICE.

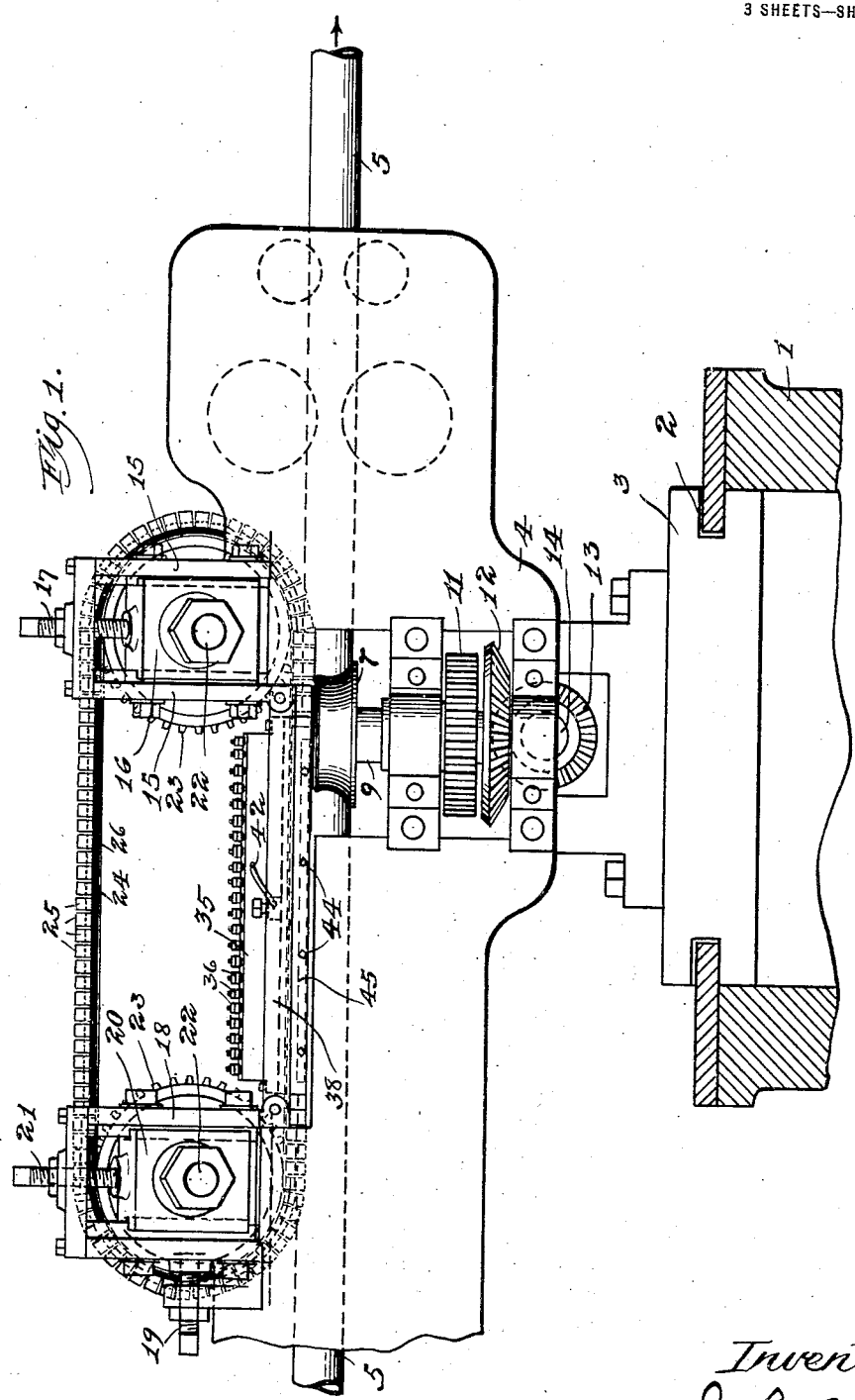

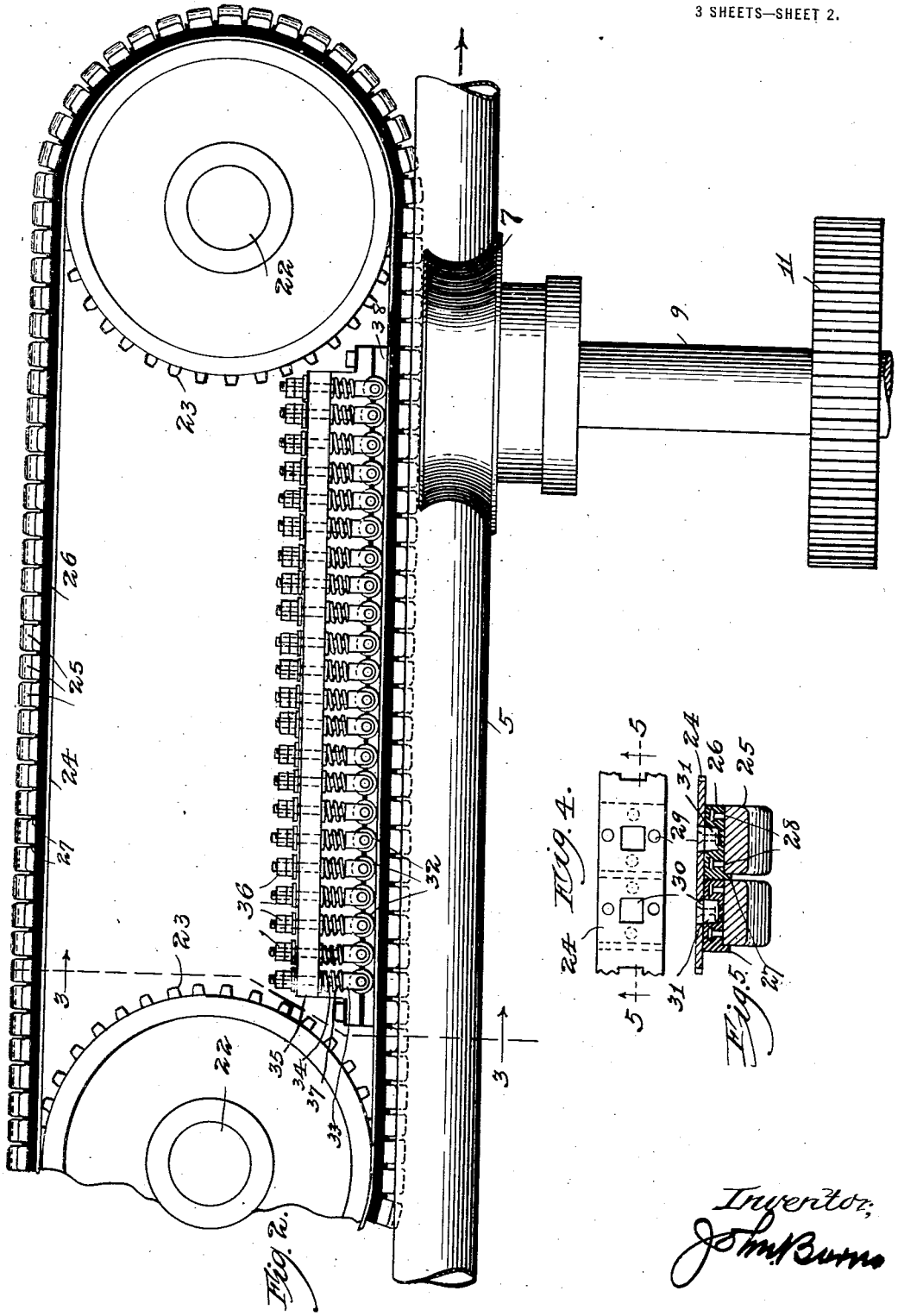

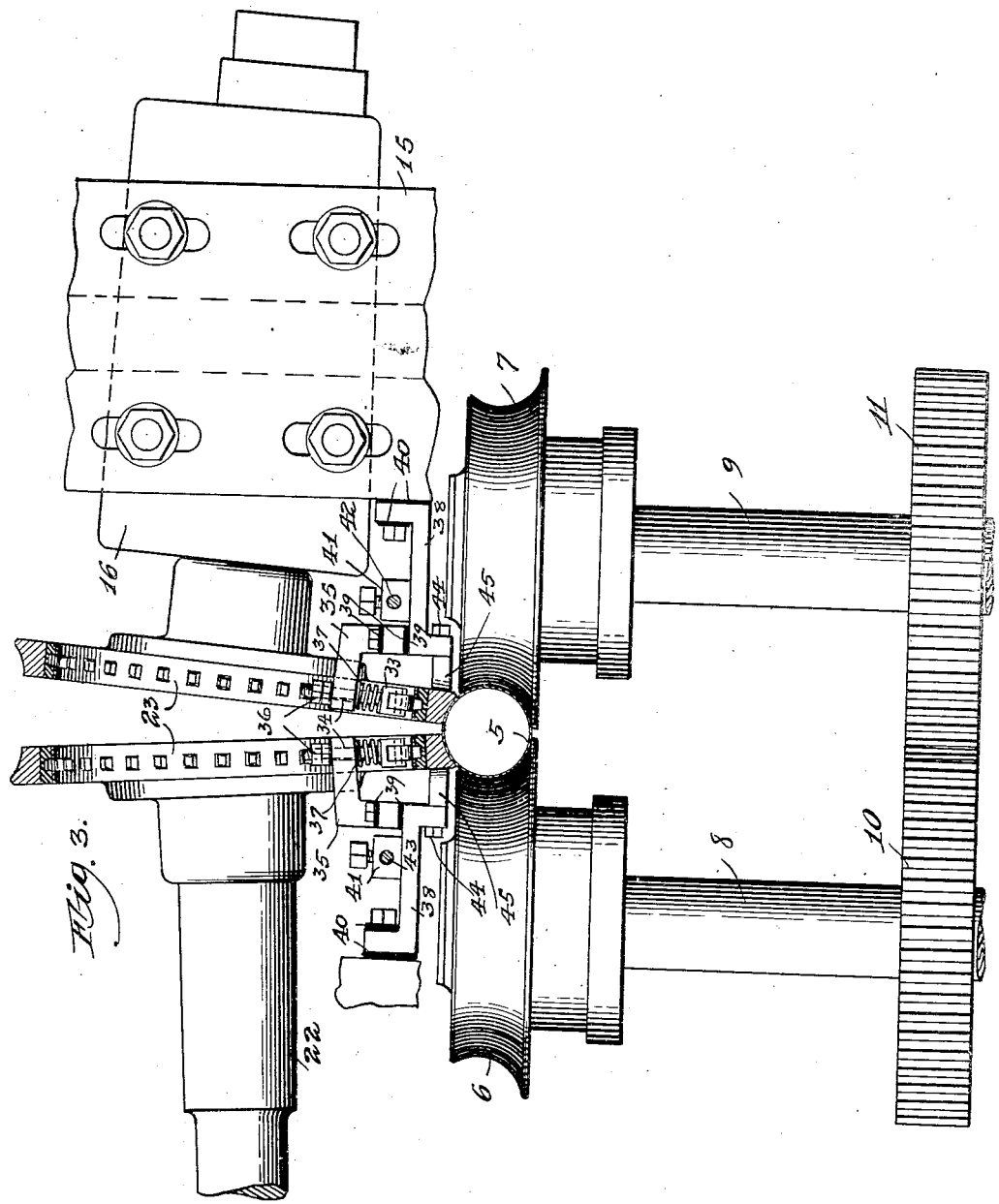

JOHN BURNS, OF KENOSHA, WISCONSIN.

PROCESS OF ELECTRICAL WELDING AND APPARATUS USED IN CONNECTION THERE-WITH.

1,271,428.  Specification of Letters Patent.  Patented July 2, 1918.

Application filed October 30, 1916. Serial No. 128,429.

*To all whom it may concern:*

Be it known that I, JOHN BURNS, a citizen of the United States, residing in the city of Kenosha, county of Kenosha, and State of Wisconsin, have invented certain new and useful Improvements in Processes of Electrical Welding and Apparatus Used in Connection Therewith, of which the following is a specification.

This invention relates to process of electrical welding and apparatus used in connection therewith and in the particular embodiment of my invention as shown in the drawings and as adapted to electrically welding the seam of a tube.

Heretofore the seam of a tube has been electrically welded through means of a pair of rotating or revolving disks, which have a substantially point contact with the tube passed beneath them. This method is relatively slow, because of the small contact between the disks and tube. Some attempts have been made to overcome this objection by means of a relatively long stationary contact shoe. The objection to this latter method is that imperfection in the exterior surfaces of the tube cannot be taken care of, resulting in uneven or local overheating.

Among the salient objects of the invention are to provide a process and apparatus by which a maximum speed is obtained without in any way lessening the efficiency of the welding operation; to provide a process in which a plurality of localized heating currents are simultaneously applied to the article being welded; to provide an apparatus of the character last referred to in which a series of current conducting blocks are mounted not only to simultaneously contact with the opposite edges of the seam of a tube but also to move in unison therewith; to provide an apparatus in which the movement of the tube and contact blocks are synchronously timed, that is to say, travel at the same speed; to provide an apparatus in which current conducting blocks are resiliently or flexibly mounted so as to take care of any imperfections in the exterior surfaces of the article being welded; to provide an apparatus which is adapted for use with tubes or other articles of varying sizes; to provide a construction in which the contact blocks are insulated from each other so as to secure a uniform local heat at the point of contact between each block and tube; to provide a construction having means for preventing sparking when the blocks first come into contact with the tube and when they leave the tube; to provide a construction which is economical of manufacture, simple in operation, and in general to provide an improved process and apparatus of the character referred to.

In the drawings:

Figure 1 is a side elevation of my improved apparatus with parts broken away to reduce the size of the drawing and parts shown in section.

Fig. 2 is a similar view to Fig. 1 on an enlarged scale, but showing more particularly the detailed construction of the traveling belt and spring mounted contact blocks.

Fig. 3 is a transverse sectional view taken on line 3—3 of Fig. 2 looking in the direction of the arrows.

Fig. 4 is a fragmentary top plan or face view of the steel belt which supports the contact blocks.

Fig. 5 is a cross sectional view taken on line 5—5 of Fig. 4 looking in the direction of the arrows.

In the drawings, 1 designates a base member, in which are slidably mounted as shown at 2, the standards 3 supporting the frame 4.

The tube 5 to be welded along a longitudinal joint is fed by any suitable feeding mechanism (not shown) to a pair of oppositely mounted pressing or crushing rolls 6 and 7. The crushing roll 6 is mounted on a shaft 8 and the roll 7 on shaft 9 suitably journaled in the frame. On these shafts are mounted intermeshing spur gears 10 and 11 respectively. The shaft 8 also carries a bevel gear 12, which meshes with a similar gear 13, carried by a drive shaft 14, driven from any suitable source of power (not shown). The driving mechanism just described serves to rotate the crushing or pressing rolls 6 and 7, their function being to force the meeting edges of the tube together at the seam when the heat conducting blocks have brought them to the fusion or welding point. These crushing rolls, it will be noted are so shaped as shown clearly in Fig. 3 as to feed lengthwise the tube or other article being welded.

As a feature of the invention, I provide means for subjecting the meeting edges of the tube to the action of a plurality of electrical heat conducting blocks carried by an endless belt. To this end, on the main frame are mounted at either side thereof a pair of stationary journal box frames 15. In each of these frames 15 is mounted a vertically adjustable journal box 16, said box being adjustable through the medium of a screw 17. At the opposite end of the frame are mounted a pair of journal box frames 18, which, however have horizontal adjustment through the action of screws 19. In each of these frames 18 is mounted a journal box 20, which is also vertically adjustable through the action of screw 21. In each of these boxes is rotatably mounted a shaft 22 carrying at its inner end a sprocket wheel 23. Around each alined pair of sprocket wheels 23 is mounted an endless belt 24, which in the present instance is a flexible steel belt or band. It is to be understood that for each belt there are a pair of shafts and sprocket wheels above described. The shafts can be raised or lowered to accommodate different sizes of tubing and the belts can be also tightened by horizontally adjusting the movable journal box frames.

Secured to the outer side of each belt and extending around the circumference thereof are a plurality of independently mounted electric contact blocks or terminals 25. These blocks are insulated from the belts as shown at 26 and in turn each block is insulated from the others as shown at 27. The blocks themselves are secured to the insulation by means of suitable studs or rivets 28 and the insulation is secured to the steel band or belt by smaller studs 29. The belts are provided with suitable spaced apertures 30 and the insulation strips with suitable registering recesses 31 to receive the sprocket wheel teeth. As the belts are driven the series of contact blocks are successively brought into electrical contact with the tube at either side of the seam (Fig. 3) and are successively moved out of such contact. To hold the blocks in adequate and proper engagement with the tube during a predetermined length of travel of the latter, I provide a series of relatively-stationary compound pressure rollers 32, each journaled in the forked end 33 of a rod or stem 34, the upper ends of which are slidable in a fixed plate 35 and limited as to downward movement therein by suitable nuts 36. A coiled expansion spring 37 is located between the lower side of the plate and each forked extension 33 so as to tend to force the rollers downwardly yieldingly into engagement with the endless traveling flat belt. Each of the two plates 35 is mounted upon a contact frame 38, but insulated therefrom as shown at 39. (See Fig. 3). The contact frames 38 are also insulated from the main frame as illustrated at 40. On each frame 38 is mounted a binding post 41, to which are secured conductors 42 and 43, connected to any suitable source of electrical current (not shown). At the inner side of each contact frame 38 is bolted as shown at 44 a contact shoe 45 disposed longitudinally of the tube to be welded, there being one of these shoes for each belt. The contact blocks receive current from these shoes and the former conduct heating current to the meeting edges of the seam only during their contact with the shoes. The length of the shoes is determined by the degree or period of heat required for any given tube. For example, on a heavy or thick tube you could lengthen your contact shoe and correspondingly shorten it with a lighter or thinner tube.

The operation of the apparatus should be apparent from the foregoing description but may be briefly described as follows:

The tube to be welded is fed beneath the traveling contact blocks with the seam positioned between the blocks. The circuit is closed between the opposite blocks. The arrangement is such that the most intense heat is obtained at the seam of the tube, namely, at the point where the greatest heat is required. The circuit is of course only closed during the time that the blocks are in contact with the shoes. It will be noted that the tubing is adequately heated before it reaches the crusher rolls. The contact blocks are held in close and firm engagement with the tube through the action of the spring mounted rollers heretofore described. This frictional engagement of the contact blocks or terminals with the tube is such that the forward movement of the tube also serves to drive the belts. Accordingly the belts will be driven in unison with the movements of the tubes. Any tendency to sparking between the crushing rolls and tubing at the point of contact and when the contact blocks or terminals first come into frictional and contactual engagement with the tube and when they leave the tube is avoided by not closing the circuit through the blocks until they go into full engagement with the tube. This is secured by so locating the contact shoes along which the blocks slide and so determining their lengths that the blocks will engage the tube before contacting with the shoes and will break contact with the shoes before the blocks leave the tube, thus restricting any tendency to arcing to the blocks and shoes and avoiding any arcing between the blocks and tube. The crusher rolls are so positioned that they act on the tube at the point when it receives its greatest heat so as to most effectively complete the weld.

It is to be understood and appreciated that this invention is not limited and restricted to the precise and exact details of construction shown and described because these may be varied within comparatively wide limits without departure from the sub-

I claim as my invention:

1. In an electric welding appliance of the character described, the combination of means to move the article to be welded, an electric terminal adapted to contact with said article adjacent to the joint to be welded, means to send an electric current through said terminal and said article or a portion thereof, and means to cause said terminal to temporarily travel with and at the speed of said article while in contact therewith to secure a sustained heating thereof, substantially as described.

2. In an electrical welding machine of the character described, the combination of means to move the article to be welded in the direction of the length of the joint to be closed, an electric terminal adapted to contact with said article adjacent to such joint, means to send an electric current through said terminal and said article or a portion thereof, and means to cause said terminal to temporarily travel with and at the speed of said article while in contact therewith to secure a sustained heating thereof, substantially as described.

3. In an electrical welding appliance of the character described, the combination of means to move the article to be welded, an electrical terminal adapted to contact with said article adjacent to the joint to be welded, means to cause said terminal to temporarily travel with and at the speed of said article while in contact therewith to secure a sustained heating thereof, and means to send an electric current through said terminal and said article or a portion thereof for a period ending before such contact is broken, substantially as described.

4. In an electrical welding machine of the character described, the combination of means to move the article to be welded in the direction of the length of the joint to be closed, an electric terminal adapted to contact with said article adjacent to such joint, means to cause said terminal to travel with and at the speed of said article temporarily while in contact therewith to secure a sustained heating thereof, and means to send an electric current through said terminal and said article or a portion thereof for a period beginning after the terminal has contacted with the article and ending before such contact is broken, substantially as described.

5. In an electrical welding appliance of the character described, the combination of means to move the article to be welded in the direction of the length of the joint to be closed, a plurality of electric terminals, means to bring said terminals successively into contact with said article and successively out of contact with said article, means to simultaneously send electric currents through said terminals and said article or a portion thereof during their contact with the article, and means to cause said terminals to temporarily travel with said article and at the speed thereof to secure a sustained heating of the parts of the article to be welded, substantially as described.

6. In an electrical welding appliance of the character described, the combination of means to move the article to be welded in the direction of the length of the joint to be closed, a plurality of electrical terminals, means to bring said terminals successively into contact with said article and successively out of contact with said article, means to cause said terminals to travel with said article temporarily and at the speed of the article while in contact therewith to secure a sustained heating of the parts of the article to be welded, and means to send electric currents through said terminals and said article or portions thereof for a period beginning after each terminal has contacted with the article and ending before such contact is broken, substantially as described.

7. In an electrical welding appliance of the character described, the combination of means to move the article to be welded in the direction of the length of the joint to be closed, an endless carrier, one or more electric terminals on said carrier adapted to contact with said article adjacent to such joint, means to send an electric current through said terminal or terminals and said article or a portion thereof, and means to cause said carrier and terminal or terminals to temporarily travel with said article and at the speed of the latter while in contact therewith to secure a sustained heating of the article to be welded, substantially as described.

8. In an electrical welding appliance of the character described, the combination of means to move the article to be welded in the direction of the length of the joint to be closed, an endless carrier, a plurality of electric terminals on said carrier adapted to contact successively with said article and successively break contact with said article, means to send electric currents through said terminals and said article or a portion thereof, and means to cause said carrier and terminals to travel with said article temporarily and at the speed thereof while the terminals are in contact therewith to secure a prolonged heating of the parts of the article to be welded, substantially as described.

9. In an electrical welding appliance of the character described, the combination of means to move the article to be welded in the direction of the length of the joint to be closed, a plurality of electrical terminals insulated from one another and adapted to contact with said article adjacent to such joint, means to bring said terminals successively into contact with said article and successively out of contact with said article, means to cause said electric terminals to travel temporarily with and at the speed of said article while in contact therewith to secure a prolonged heating of the parts of the article to be welded, and means to send electric currents through said terminals and said article or portions thereof during the contact of said terminals with the article, substantially as described.

10. In an electrical welding appliance of the character described, the combination of means to move the article to be welded in the direction of the length of the joint to be closed, an endless carrier, a plurality of electrical terminals mounted on said carrier, insulated from one another, and adapted to contact with said article adjacent to such joint, means to bring said terminals successively into contact with said article and successively out of contact with said article, means to cause said carrier and terminals to travel temporarily with and at the speed of said article while in contact therewith to secure a prolonged heating of the parts of the article to be welded, and means to send an electric current through each terminal and said article or portion thereof for a period ending before such contact is broken, substantially as described.

11. In an electrical welding appliance of the character described, the combination of means to move the article to be welded in the direction of the length of the joint to be closed, an endless carrier, a plurality of electrical terminals mounted on said carrier, insulated from one another, and adapted to contact with said article adjacent to such joint, means to bring said terminals successively into contact with said article and successively out of contact with said article, means to cause said carrier and terminals to travel temporarily with and at the speed of said article while in contact therewith to secure a prolonged heating of the parts of the article to be welded, and means to send electric currents through said terminals and said article or portions thereof for a period beginning after the terminals have contacted with the article and ending before such contact is broken, substantially as described.

12. In an electrical welding appliance of the character described, the combination of means to move the article to be welded in the direction of the length of the joint to be closed, an endless carrier, a plurality of electrical terminals mounted on said carrier adapted to contact with said article adjacent to such joint, means to bring said terminals successively into contact with said article and successively out of contact with said article, means to cause said carrier and terminals to travel temporarily with and at the speed of said article while in contact therewith to secure a prolonged heating of the parts of the article to be welded, and means to send electric currents through said terminals and said article or a portion thereof including a relatively-stationary contact shoe with which said terminals are adapted to contact, substantially as described.

13. In an electrical welding appliance of the character described, the combination of means to feed the article to be welded in the direction of the length of the joint to be closed, a pair of endless carriers, a plurality of electric terminals mounted on each of said carriers adapted to contact with said article adjacent to such joint, means to bring the terminals of each carrier successively into contact with said article and successively out of contact with said article, means to cause said carriers and their terminals to travel temporarily with and at the speed of said article while in contact therewith to secure a prolonged heating of the parts of the article to be welded, and means to simultaneously send a plurality of electric currents through corresponding terminals of said carriers and said article or portions thereof, substantially as described.

14. In an electrical welding appliance of the character described, the combination of means to feed the article to be welded in the direction of the length of the joint to be closed, an endless carrier, a plurality of electrical terminals mounted on said carrier, insulated from said carrier, insulated from each other, and adapted to contact with said article adjacent to such joint, means to bring said terminals successively into contact with said article and successively out of contact with said article, means to press said terminals against said article, means to cause said carrier and its terminals to travel temporarily with and at the speed of said article while in contact therewith to secure a prolonged heating of the parts of the article to be welded, and means to send a plurality of local electric heating currents through said terminals and said article, substantially as described.

15. In an electric welding appliance of the character described, the combination of means to feed the article to be welded, an electric terminal adapted to contact with said article adjacent to the joint to be welded, means to send an electric current through said terminal and said article or a portion thereof during a predetermined travel of the article, and means to cause said terminal to temporarily travel with and at the speed of said article while in contact therewith to secure a sustained heating thereof, substantially as described.

16. In an electric welding appliance of the character described, the combination of means to feed the article to be welded in the direction of the length of the joint to be closed, a plurality of electrical terminals, means to bring said terminals successively into contact with said article and successively out of contact with said article, means to simultaneously send electric currents through said terminals and said article or a portion thereof during their contact with the article, means to cause said terminals to temporarily travel with said article and at the speed thereof while in contact therewith to secure a sustained heating of the parts of the article to be welded, and means to press the meeting edges of the joint together when the same have been brought to the required heat, substantially as described.

17. In an electric welding appliance of the character described, the combination of means to feed the article to be welded, an endless carrier, a mounting therefor, a plurality of electric terminals on said carrier positioned during a portion of their travel to temporarily contact a plurality at a time with and move at the speed of said article, and means to send electric heating currents simultaneously through said article and said terminals while they are in contact therewith, said article feeding means actuating said carrier and terminals by reason of the latter engaging the traveling article, substantially as described.

18. In an electric welding appliance of the character described, the combination of means to feed the article to be welded in the direction of the length of the joint to be closed, an endless carrier, a mounting therefor, a plurality of electric terminals on said carrier positioned during a portion of their travel to temporarily contact a plurality at a time with and move at the speed of said article, means to press said terminals against said article, means to send electric heating currents simultaneously through said article and said terminals while they are in contact therewith, said article feeding means actuating said carrier and terminals by reason of the latter engaging the traveling article, and means to press the joint together after the parts have been brought to the required heat, substantially as described.

19. The process of electric welding consisting in feeding the article to be welded, simultaneously applying thereto a plurality of local electric currents, and causing said currents to travel with said article temporarily, whereby to secure a prolonged heating thereof, substantially as described.

20. The process of electric welding consisting in feeding the article to be welded, simultaneously applying thereto a plurality of closely adjacent local electric currents, and sustaining the heat at said several local areas of the article during its travel, substantially as described.

21. The process of electric welding consisting in feeding the article to be welded in the direction of the length of the joint to be closed, simultaneously applying thereto a plurality of adjacent local heating electric currents, sustaining the heat at said several local areas of the article during a predetermined travel thereof, and pressing the parts of the heated joint together to complete the welding operation, substantially as described.

22. The process of electric welding consisting in feeding the article to be welded in the direction of the length of the joint to be closed, simultaneously applying to the article a plurality of local heating electric currents, causing said currents to travel with said article temporarily whereby to secure a prolonged heating thereof, and pressing the heated joint parts together to complete the welding operation, substantially as described.

23. The process of electric welding consisting in heating the article to be welded, simultaneously applying thereto a plurality of adjacent local heating electric currents, sustaining the heat at said several local areas during a predetermined travel of the article, and controlling the application and cessation of said heating electric currents by the travel of the article, substantially as described.

JOHN BURNS.

Witnesses:
J. H. CANTWELL,
C. E. HAWLEY.